US012675952B2

(12) United States Patent
Morisawa

(10) Patent No.: US 12,675,952 B2
(45) Date of Patent: Jul. 7, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Keisuke Morisawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 183 days.

(21) Appl. No.: 18/676,555

(22) Filed: May 29, 2024

(65) Prior Publication Data

US 2024/0420422 A1 Dec. 19, 2024

(30) Foreign Application Priority Data

Jun. 19, 2023 (JP) ................................. 2023-100350

(51) Int. Cl.
*G06T 17/20* (2006.01)
*G06T 7/73* (2017.01)
*G06T 7/90* (2017.01)
*G06V 10/44* (2022.01)

(52) U.S. Cl.
CPC ............... *G06T 17/20* (2013.01); *G06T 7/73* (2017.01); *G06T 7/90* (2017.01); *G06V 10/44* (2022.01)

(58) Field of Classification Search
CPC .. G06T 17/20; G06T 7/73; G06T 7/90; G06T 2207/10024; G06T 2207/30196; G06T 2207/30221; G06T 7/564; G06T 17/00; G06V 10/44
See application file for complete search history.

(56) References Cited

U.S. PATENT DOCUMENTS

| | | | | |
|---|---|---|---|---|
| 6,879,323 B1 * | 4/2005 | Takezawa | ............... | G06T 17/00 |
| | | | | 340/5.83 |
| 10,970,916 B2 * | 4/2021 | Araki | .................... | G06T 15/205 |
| 11,574,432 B2 | 2/2023 | Morisawa | | |
| 12,406,385 B2 * | 9/2025 | Takama | .................... | G06T 7/50 |

(Continued)

FOREIGN PATENT DOCUMENTS

JP 2018063635 A * 4/2018

OTHER PUBLICATIONS

Seitz, S.M. et al., "Photorealistic Scene Reconstruction by Voxel Coloring" Int. Journal of Computer Vision (Nov. 1999) pp. 1-32, vol. 35, No. 2.

*Primary Examiner* — Jason Chan
*Assistant Examiner* — Hyorim Park
(74) *Attorney, Agent, or Firm* — Carter, DeLuca & Farrell LLP

(57) ABSTRACT

A first model generated by deforming, based on the orientation of an object identified by a plurality of texture images representing a color of the object based on image capturing of a plurality of imaging devices, a base model stored in advance and representing the basic three-dimensional shape of the object is obtained. Further, a second model representing the three-dimensional shape of the object, which is generated based on a silhouette image based on image capturing of the plurality of imaging devices, is obtained. Then, an unnecessary element among elements configuring the second model is deleted based on a difference between the first model and the second model. Due to this, the accuracy of a three-dimensional model is improved.

12 Claims, 13 Drawing Sheets

(56)                    References Cited

U.S. PATENT DOCUMENTS

| | | | |
|---|---|---|---|
| 2013/0201187 A1* | 8/2013 | Tong | G06V 40/172 |
| | | | 345/420 |
| 2013/0307848 A1* | 11/2013 | Tena | G06T 17/205 |
| | | | 345/420 |
| 2020/0320727 A1* | 10/2020 | Smolic | G06T 15/08 |
| 2022/0012932 A1 | 1/2022 | Morisawa | |
| 2024/0338892 A1 | 10/2024 | Morisawa | |

* cited by examiner

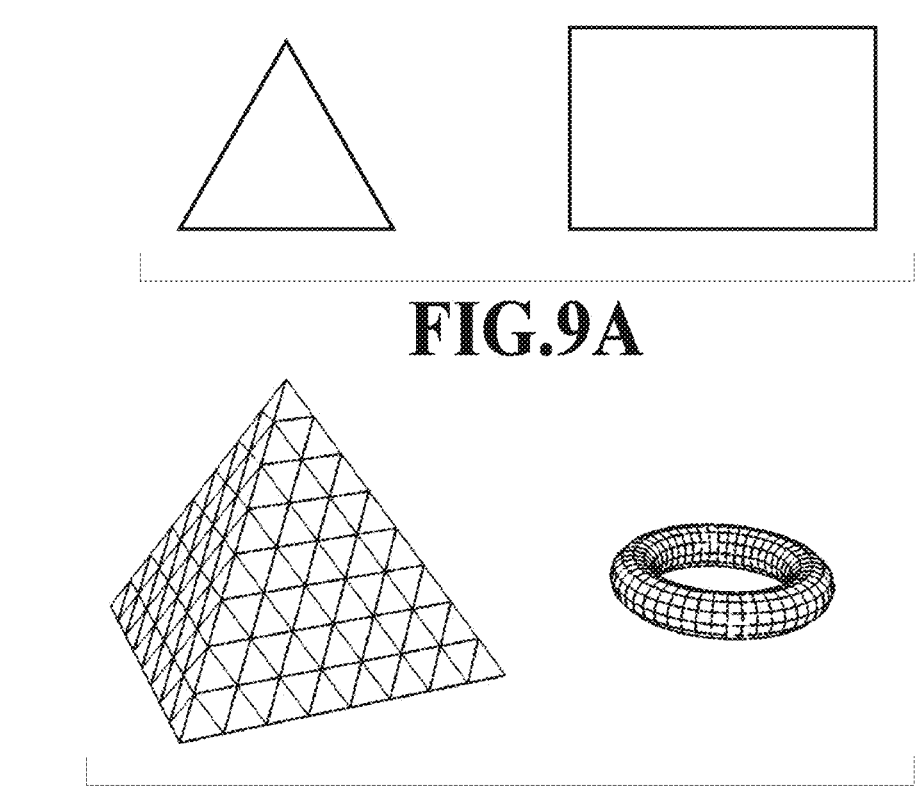
FIG.9A
FIG.9B
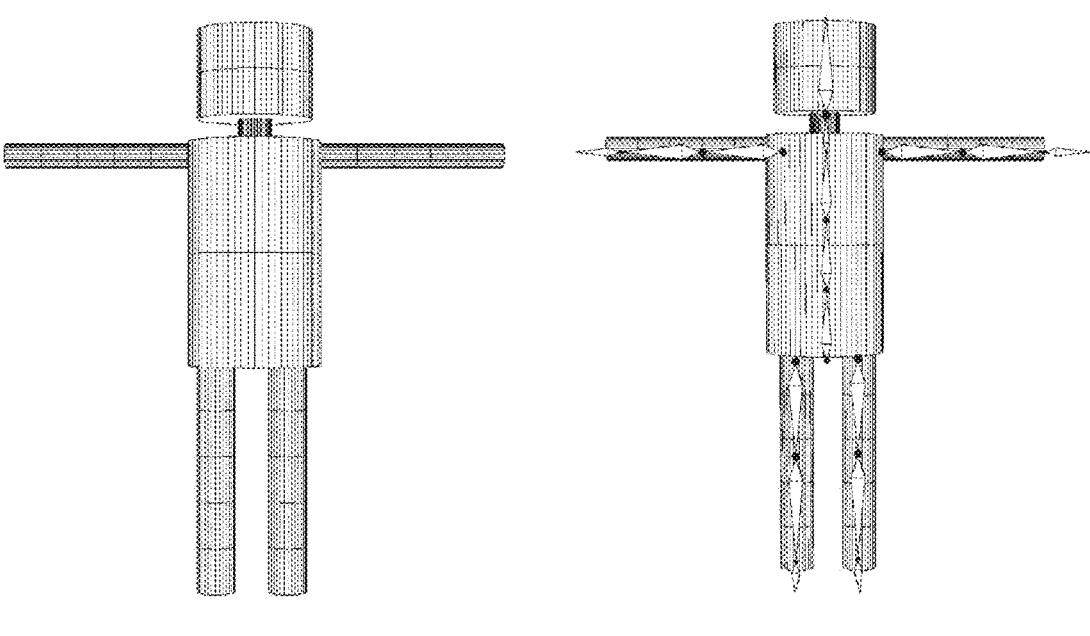
FIG.9C          FIG.9D

IMAGE PROCESSING APPARATUS, IMAGE PROCESSING METHOD, AND STORAGE MEDIUM

FIELD

The present disclosure relates to a technique to generate three-dimensional shape data of an object from a plurality of captured images.

DESCRIPTION OF THE RELATED ART

As a method of generating three-dimensional shape data (in the following, called "3D model") of an object based on a plurality of captured images obtained by a plurality of cameras capturing the object from different viewpoints, the visual hull method is known. The visual hull method of generating a 3D model by leaving only the common area of the visual hulls of a plurality of cameras based on a plurality of mask images representing the silhouette of the object generated from a plurality of captured images is a method of obtaining a 3D model stably and at a high speed. On the other hand, for the concave shape portion or occlusion area of an object, there is such a principle drawback that it is not possible to correctly represent the shape of the object because of the portions not deleted but left. S. Seitz and C. Dyer: "Photorealistic Scene Reconstruction by Voxel Coloring, "International Journal of Computer Vision, 35 (2), pp. 151-173 (1999) (in the following, described as Document 1) has disclosed a method of compensating for the above-described drawback by performing accuracy improvement processing using color information on an object for the 3D model found by the visual hull method. Specifically, on the assumption that the pixel value of a voxel configuring the surface of an object has the same pixel value in each captured image of the projection destination in a case where the voxel is projected onto the captured images of a plurality of cameras from which the voxel is viewed, each voxel is projected onto the captured image of the camera from which the voxel is viewed. Then, the pixel values in the plurality of captured images of the projection destination are obtained and the voxel whose variance of the pixel values is small is left and the voxel whose variance of the pixel values is large is deleted. By repeating the processing such as this sequentially for all the voxels configuring the surface of the object, it is made possible to delete the voxel in the concave shape portion and occlusion area, and therefore, the generation of a 3D model of high accuracy is made possible.

In a case where many objects are included within the captured image (for example, in the game of rugby or soccer, and the like), on a condition that the method in Document 1 described above is applied by taking all the objects as a target, the processing load becomes extremely heavy. Further, in a case where the deletion processing using color information is applied also to the area whose shape accuracy is high of the 3D model, for example, due to the influence of the specular reflection having occurred on the surface of the object, the area that should originally be left is deleted erroneously, and therefore, the shape accuracy deteriorates on the contrary.

SUMMARY

The present disclosure has been made in view of the above-described problem and an object thereof is to provide a technique to improve the accuracy of a three-dimensional model.

The image processing apparatus according to the present disclosure is an image processing apparatus including: one or more memories storing instructions; and one or more processors executing the instructions to perform: obtaining a first model generated by deforming, based on the orientation of an object identified by a plurality of texture images representing a color of the object based on image capturing of a plurality of imaging devices, a base model stored in advance and representing the basic three-dimensional shape of the object; obtaining a second model representing the three-dimensional shape of the object, which is generated based on a silhouette image based on image capturing of the plurality of imaging devices; and deleting one or more unnecessary elements among elements configuring the second model based on a difference between the first model and the second model.

Further features of the present disclosure will become apparent from the following description of exemplary embodiments with reference to the attached drawings.

BRIEF DESCRIPTION OF THE DRAWINGS

FIG. 9A to FIG. 9D are each a diagram explaining deformation of a base model based on orientation information;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

In the present embodiment, processing is explained, which improves accuracy by deforming a 3D model in the mesh format (in the following, "mesh model") created in advance based on its orientation information, comparing the deformed mesh model and a 3D model generated by the visual hull method, and estimating shape accuracy for each region. The 3D model is three-dimensional shape data representing the three-dimensional shape of an object. This 3D model may be represented in the point cloud format or the voxel format, in place of the mesh format.

<System Configuration>

Figure 1:
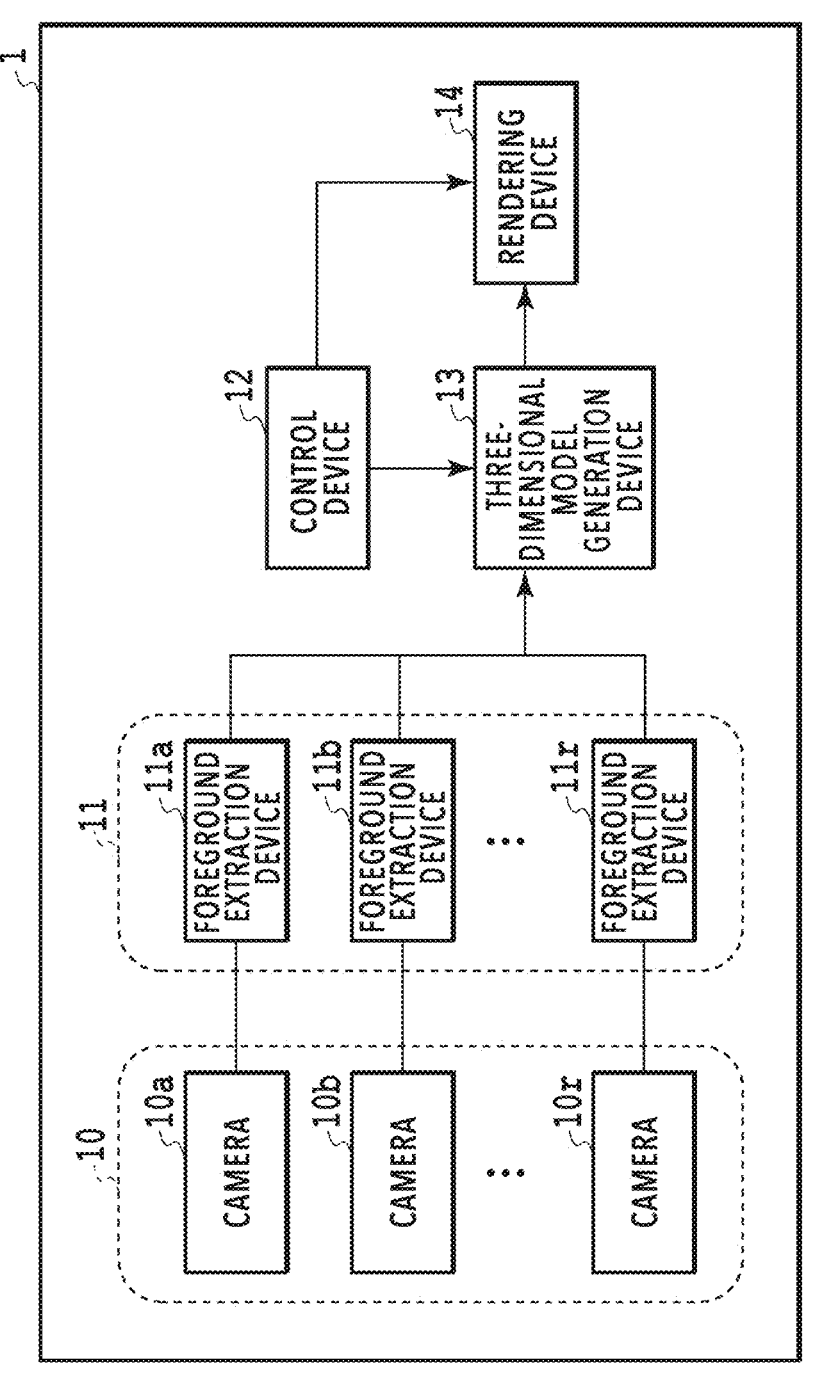
FIG. 1 is a block diagram showing a configuration example of a virtual viewpoint image generation system 1.

FIG. 1 is a block diagram showing a configuration example of the virtual viewpoint image generation system 1 including a 3D model generation device according to the present embodiment. The virtual viewpoint image generation system 1 has an imaging device group (camera array) 10, a foreground extraction device group 11, a control device 12, a 3D model generation device 13, and a rendering device 14.

The camera array 10 includes a plurality of cameras 10a to 10r and outputs a plurality of captured images obtained by performing synchronous image capturing for an object from a variety of angles to the foreground extraction device group 11. The foreground extraction device group 11 includes a plurality of foreground extraction devices 11a to 11r corresponding to each of the plurality of the cameras 10a to 10r.

Figure 2:
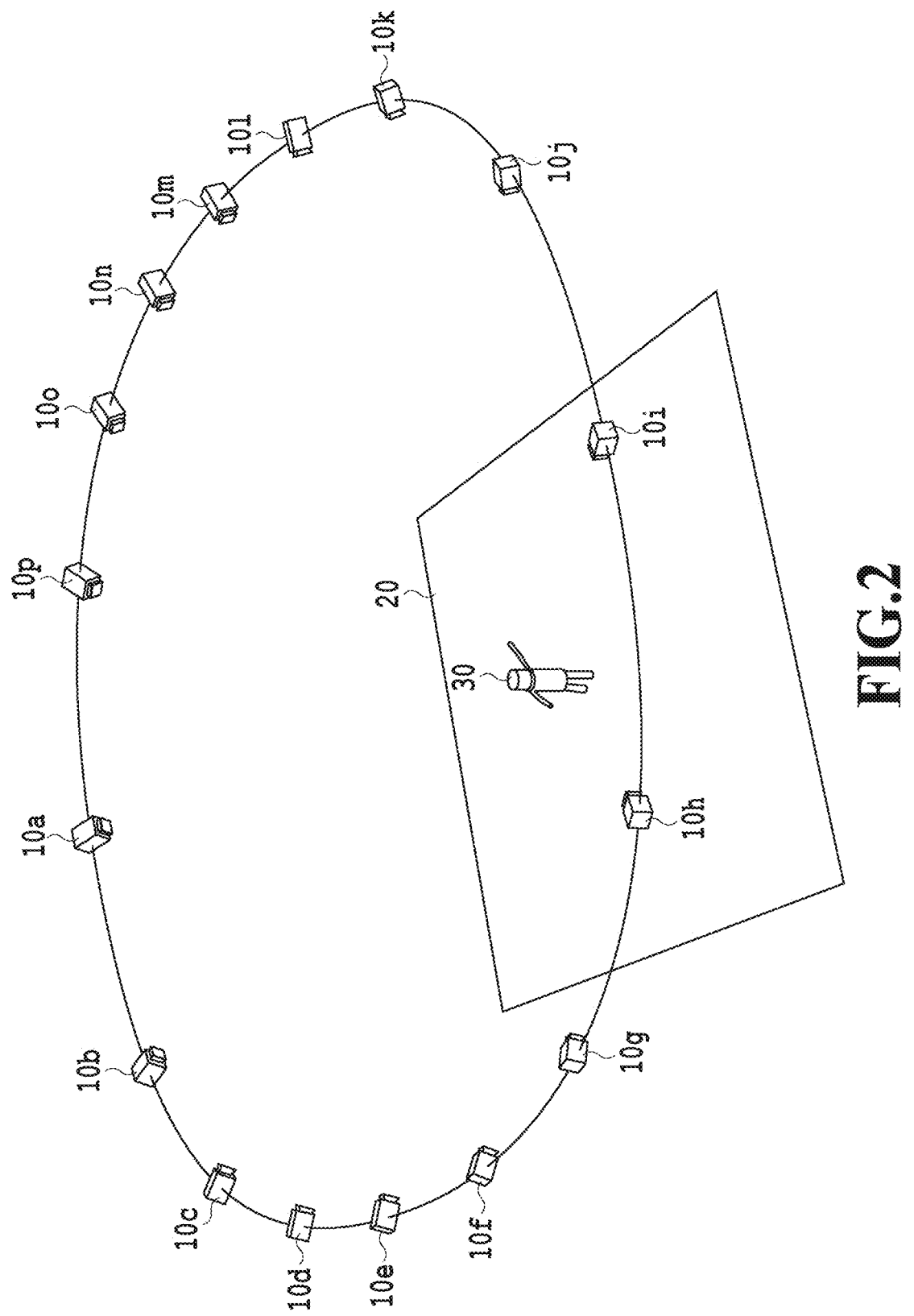
FIG. 2 is a diagram showing one example of camera arrangement in the virtual viewpoint image generation system.

In the present embodiment, each of the cameras 10a to 10r configuring the camera array 10 is arranged around a rectangular image capturing area 20 as shown in FIG. 2 and a person 30 who is an object is captured with all the cameras 10a to 10r from a variety of angles by synchronizing time.

Figure 3A:
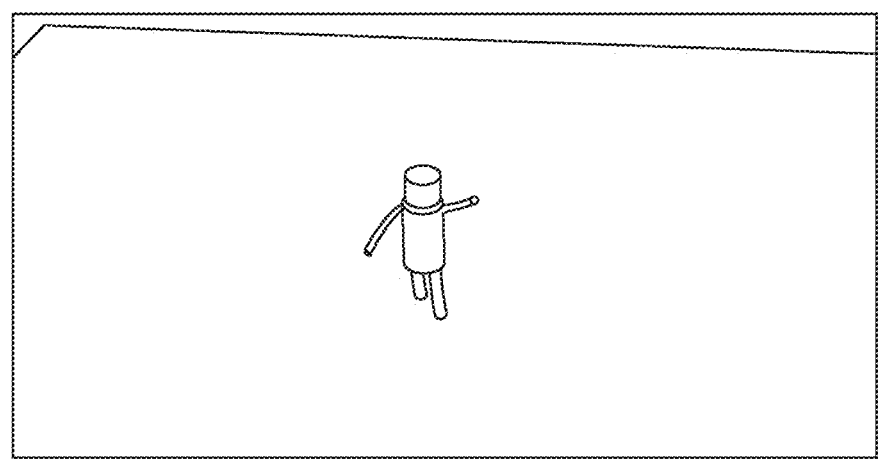
FIG. 3A is a diagram showing one example of a captured image.
Figure 3B:
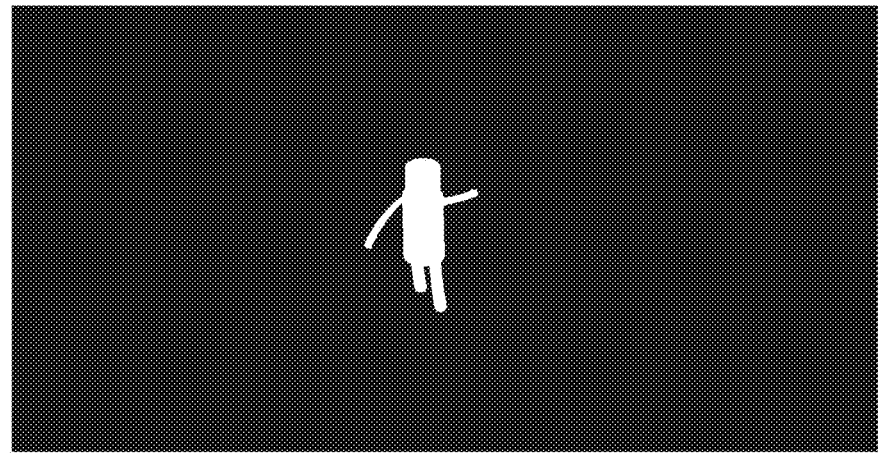
FIG. 3B is a diagram showing one example of a mask image.
Figure 3C:
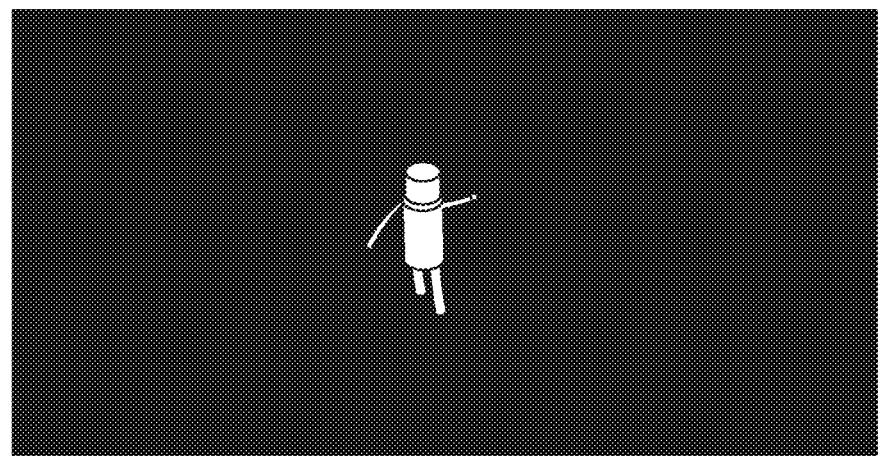
FIG. 3C is a diagram showing one example of a texture image.

Each of the foreground extraction devices 11a to 11r configuring the foreground extraction device group 11 extracts the area (foreground area) corresponding to the two-dimensional silhouette of an object from each of a plurality of captured images output from the plurality of the cameras 10a to 10r. Then, a mask image and a texture image of each captured image are generated. The mask image is a one-bit image representing the area by two values, that is, the extracted foreground area by "1 (white)" and the background area other than the foreground area by "0 (black)", and the mask image is also called a silhouette image. Further, the texture image is an image obtained by changing the background area of the captured image to black, leaving the color (texture) of only the foreground area. FIG. 3A shows the captured image obtained by the camera g and FIG. 3B and FIG. 3C show the mask image and the texture image, respectively, which are generated by the foreground extraction device 11g corresponding to the camera 10g and correspond to the captured image in FIG. 3A. As the foreground area extraction method, for example, there is a method in which the input captured image and the background image stored in advance in each of the foreground extraction devices 11a to 11r are compared and the area whose luminance difference or color difference is large is determined to be the foreground area. For the extraction of the foreground area, it may also be possible to use, for example, a method based on the distance from the camera to the foreground, not limited to the method based on the luminance difference or color difference.

In a case where a virtual viewpoint image is generated by using the captured images of a plurality of cameras, the camera parameters of each of the cameras 10a to 10r configuring the camera array 10 are necessary. The control device 12 obtains the camera parameters of each of the cameras 10a to 10r by performing calibration at the time of the installation of the cameras. Here, the camera parameters refer to intrinsic parameters (focal length, image center, lens distortion parameter and the like) specific to the camera, extrinsic parameters (rotation matrix, position vector and the like) representing the position and orientation of the camera, and the like. In the calibration, by using the captured image of each camera having captured a dedicated checkerboard, processing to find the correspondence relationship between the point in the three-dimensional world coordinate system and the two-dimensional point corresponding thereto is performed. The camera parameters thus obtained of each of the cameras 10a to 10r are output to the 3D model generation device 13 and the rendering device 14.

The 3D model generation device 13 receives the camera parameters of each of the cameras 10a to 10r from the control device 12 and the foreground image set (set of the mask image and the texture image obtained from each captured image) corresponding to each of the cameras 10a to 10r from the foreground extraction device group 11. Then, the 3D model generation device 13 generates a 3D model representing the three-dimensional shape of an object by a voxel set (or point cloud) by the visual hull method using the mask image of each camera. Further, the 3D model generation device 13 performs processing to improve accuracy by correcting the generated 3D model based on the color information on the texture image of each camera. The 3D model thus obtained is output to the rendering device 14 along with the texture image. Details of the processing performed by the 3D model generation device 13 will be described later.

The rendering device 14 finds the positional relationship between each texture image and the 3D model by using the camera parameters of each camera and performs rendering processing to color each voxel, which is the element configuring the 3D model, by using the color of the pixel in the corresponding texture image. By this rendering processing, the image capturing-target three-dimensional space is reconstructed and the virtual viewpoint image showing the appearance from an arbitrary virtual viewpoint is generated.

The above is the outline of each device configuring the virtual viewpoint image generation system 1. The connection method between the foreground extraction devices 11a to 11r and the 3D model generation device 13 may be a topology, such as the star, ring, bus or the like.

<Details of 3D Model Generation Device>

Following the above, the hardware configuration and the logic configuration (software configuration) of the 3D model generation device 13, and the operation flow of the 3D model generation device 13, which is implemented by those configurations, are explained in detail with reference to the drawings.

<<Hardware Configuration>>

Figure 4:
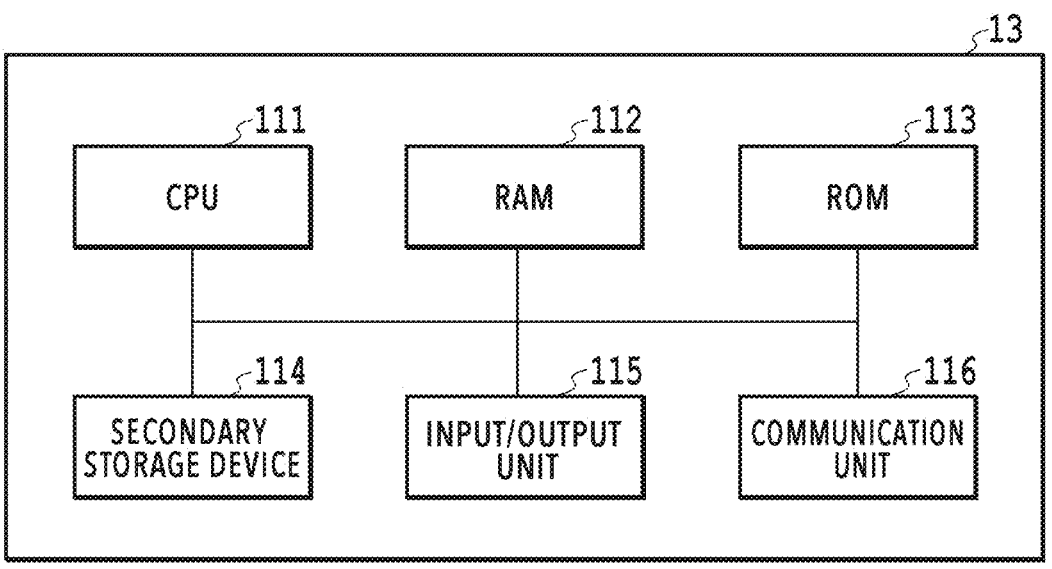
FIG. 4 is a diagram showing a hardware configuration of a 3D model generation device.

FIG. 4 is a block diagram showing a hardware configuration example of the 3D model generation device 13, which is an image processing apparatus. A CPU 111, which is a computation device, controls the whole of the 3D model generation device 13 by executing programs stored in a ROM 112 or a RAM 113, which are each a primary storage device. The CPU 111 implements each function unit of the 3D model generation device 13 shown in FIG. 5, to be described later, by loading predetermined programs stored in a secondary storage device 114 onto the RAM 113 and executing the programs loaded onto the RAM 113. The ROM 112 is a read-only nonvolatile memory. The RAM 113 is a memory readable and writable at all times. The secondary storage device 114 is, for example, a large-capacity storage device including a hard disk or the like. The secondary storage device 114 stores a plurality of captured images captured by the plurality of the cameras 10a to 10r, camera parameters and the like. An input/output unit 115 receives various user inputs to the 3D model generation device 13. A communication unit 116 is an interface for performing transmission and reception of various kinds of data with an external device, such as the foreground extraction device group 11 and the rendering device 14. The external device and the 3D model generation device 13 are connected via a network, such as LAN.

<<Software Configuration>>

Figure 5:
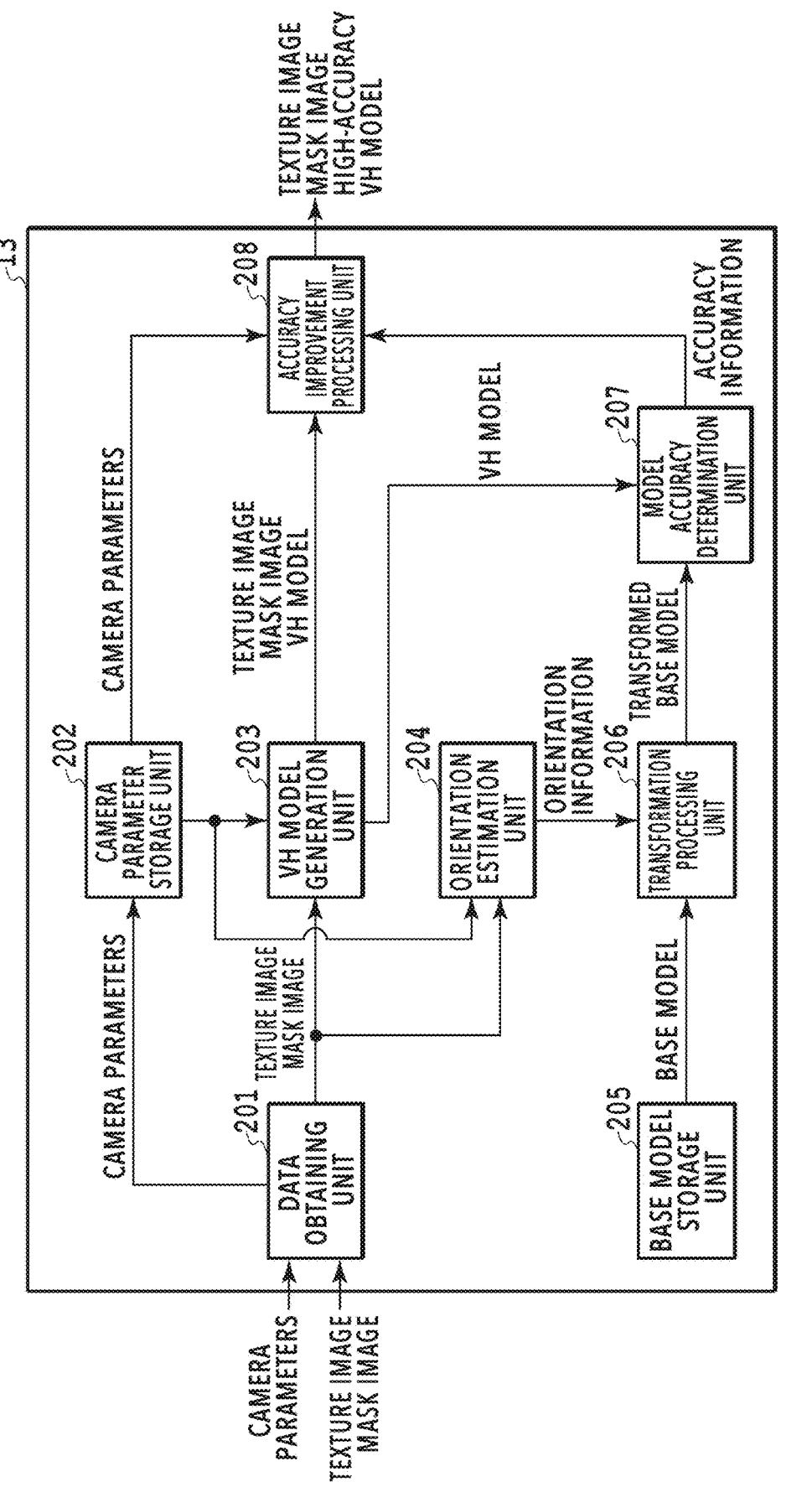
FIG. 5 is a function block diagram of the 3D model generation device.

FIG. 5 is a function block diagram showing a software configuration example of the 3D model generation device 13. As shown in FIG. 5, the 3D model generation device 13 has a data obtaining unit 201, a camera parameter storage unit 202, a VH model generation unit 203, an orientation estimation unit 204, a base model storage unit 205, a deformation processing unit 206, a model accuracy determination unit 207, and an accuracy improvement processing unit 208. Each of these function units is implemented by the CPU 111 described previously executing a predetermined program. In the following, each function unit is explained.

The data obtaining unit 201 obtains camera parameters of all the cameras from the control device 12. Further, the data obtaining unit 201 obtains a foreground image set corresponding to each of all the cameras from the foreground extraction device group 11.

The camera parameter storage unit 202 stores the camera parameters of all the cameras obtained by the data obtaining unit 201. The stored camera parameters are output to the VH model generation unit 203 and the accuracy improvement processing unit 208.

The VH model generation unit 203 generates the 3D model of an object captured in the captured image by the visual hull method using the mask image included in the foreground image set input from the data obtaining unit 201 and the camera parameters stored by the camera parameter storage unit 202. In the following explanation, it is assumed that the 3D model representing the three-dimensional shape of an object obtained by the visual hull method by a voxel set or point cloud is described as "VH model". The generated VH model is output to the model accuracy determination unit 207 and the accuracy improvement processing unit 208.

The orientation estimation unit 204 estimates the orientation of a target object and outputs the obtained estimation results to the deformation processing unit 206 as orientation information. Details of the orientation estimation will be described later.

The base model storage unit 205 stores the 3D model created in advance, which represents the basic three-dimensional shape of a target object. This 3D model created in advance is used as the source of deformation in deformation processing, to be described later, and in the following, this is described as "base model". In a case where the image capturing-target scene is, for example, a game of soccer and the target object is a field player, it may also be possible to store one base model common to all the field players, or it may also be possible to store an individual base model for each field player.

The deformation processing unit 206 performs processing to deform the base model stored by the base model storage unit 205 in accordance with the orientation indicated by the orientation information input from the orientation estimation unit 204. The base model having been deformed (in the following, called "deformed base model") is output to the model accuracy determination unit 207.

The model accuracy determination unit 207 compares the deformed base model input from the deformation processing unit 206 and the VH model input from the VH model generation unit 203 and estimates the shape accuracy of the VH model. The estimation results of the shape accuracy are output to the accuracy improvement processing unit 208 as accuracy information.

The accuracy improvement processing unit 208 performs accuracy improvement processing for the VH model input from the VH model generation unit 203 based on the accuracy information input from the model accuracy determination unit 207. Details of the accuracy improvement processing will be described later. The VH model obtained by the accuracy improvement processing (in the following, described as "high-accuracy VH model") is output to the rendering device 14 in association with the corresponding foreground image set (texture image+mask image).

Each of the above-described function units is implemented by the CPU 111 executing a predetermined program, but this is not limited. For example, it may also be possible to utilize hardware, such as GPU (Graphics Processing Unit) and FPGA (Field Programmable Gate Array), for increasing the speed of computation. That is, it may also be possible to implement each function unit of the 3D model generation device 13 by cooperation between software and hardware, such as a dedicated IC, or it may also be possible to implement part or all of the functions by hardware alone. Further, it may also be possible to use such a configuration in which the processing of each function unit is distributed and performed by using a plurality of the 3D model generation devices 13.

<<Operation Flow>>

Figure 6:
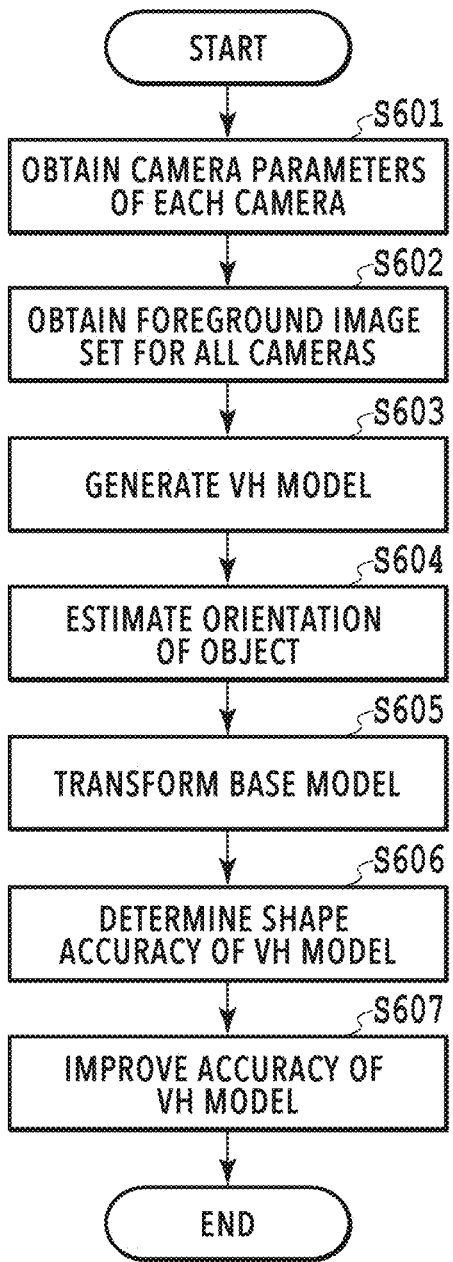
FIG. 6 is a flowchart showing a flow of the operation of the 3D model generation device.

FIG. 6 is a flowchart showing a flow of the operation of the 3D model generation device 13 according to the present embodiment. In the following explanation, explanation is given on the assumption that only one generation-target object of a 3D model is captured within a captured image, but in a case where a plurality of objects is captured within a captured image, processing is performed for each object. In the following explanation, a symbol "S" means a step.

At S601, the data obtaining unit 201 obtains the camera parameters of all the cameras 10*a* to 10*r* from the control device 12 via the communication unit 116.

At S602, the data obtaining unit 201 obtains a foreground image set corresponding to all the cameras, which is generated from each captured image, from the foreground extraction device group 11 via the communication unit 116.

At S603, the VH model generation unit 203 generates the VH model of a target object by the visual hull method using the camera parameters of all the cameras obtained at S601 and a plurality of mask images included in the foreground image set corresponding to all the cameras obtained at S602. In the present embodiment, a 3D model including a set of voxels (in the following, called "voxel model") is generated as a VH model.

Figure 7:
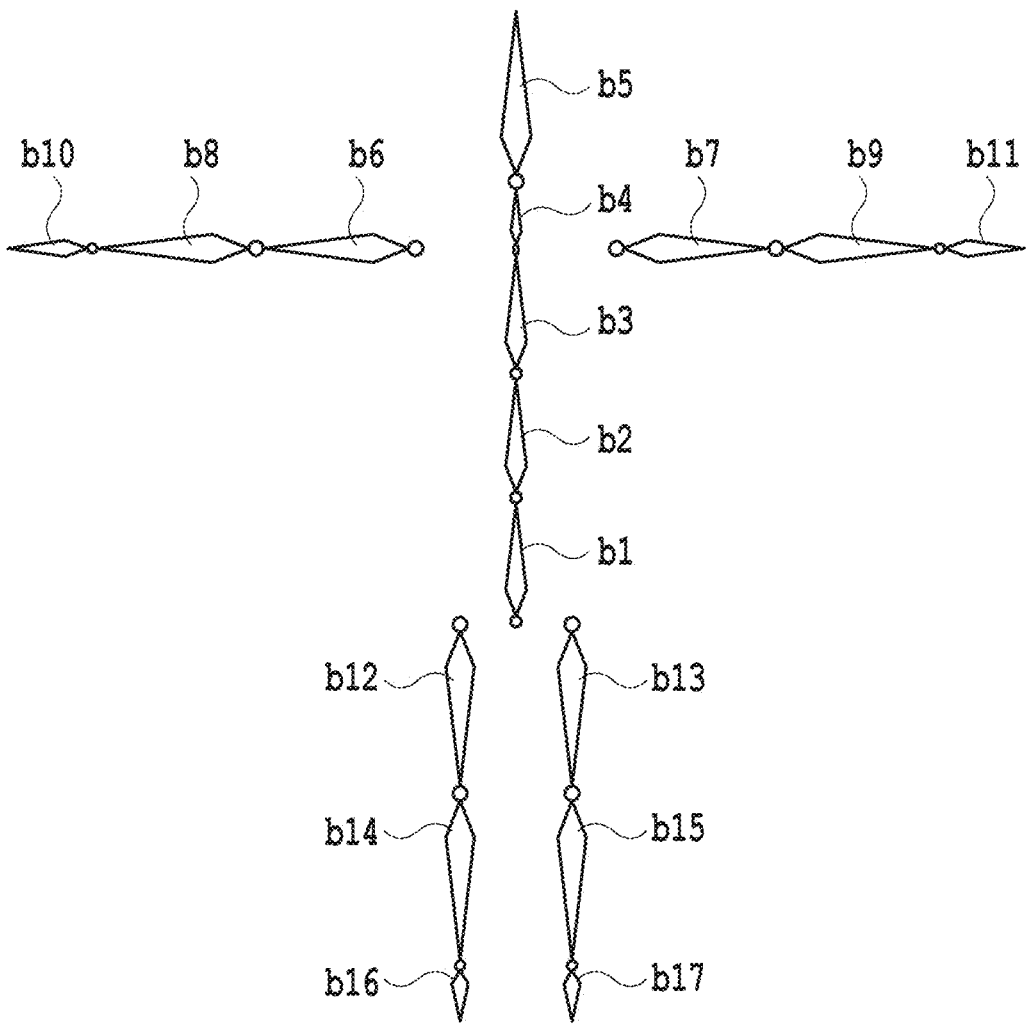
FIG. 7 is a diagram showing one example of Bone as orientation information.

At S604, the orientation estimation unit 204 generates orientation information by estimating the three-dimensional orientation of a target object based on a plurality of texture images included in the foreground image set corresponding to all the cameras obtained at S602. Here, the orientation estimation, which is a technique to visualize the orientation of an object, is explained in detail by taking a case as an example where the target object is a person. In order to obtain orientation information on a person, first, coordinate data of feature points of a target person is obtained from each of the plurality of texture images. Then, based on the coordinate data of the feature points, information is generated that represents the three-dimensional orientation of a person by a set of parts simulating the bone structure of a human body, which is generally called "Bone", connecting elements configuring the human body. FIG. 7 shows one example of Bone. The example in FIG. 7 includes 17 parts in total, that is, a waist b1, an abdomen b2, a chest b3, a neck b4, a head b5, a right upper arm b6, a left upper arm b7, a right forearm b8, a left forearm b9, a right hand b10, a left hand b11, a right thigh b12, a left thigh b13, a right leg b14, a left leg b15, a right foot b16, and a left foot b17. However, the bone structure shown in FIG. 7 is one example and it may also be possible to define more detailed Bone or more simplified Bone. At this step, first, for each texture image of each camera, the two-dimensional orientation is estimated and by combining two-dimensional orientation estimation results obtained from all the texture images and the camera parameters of all the cameras, the three-dimensional orientation of a person is estimated.

Figures 8A, 8B, 8C, 8D:
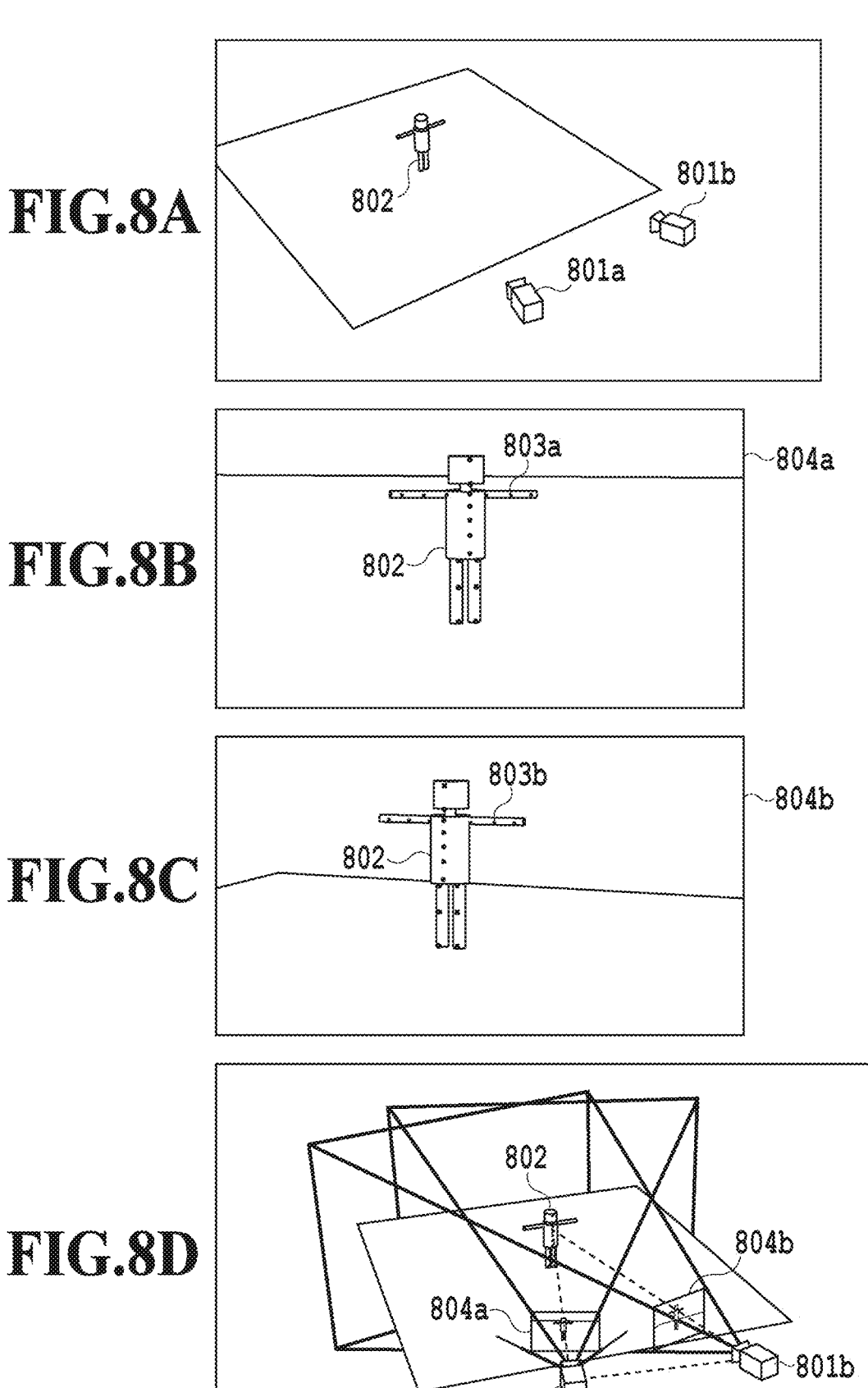
FIG. 8A to FIG. 8D are each a diagram explaining the way a three-dimensional orientation of a person is estimated.

FIG. 8A to FIG. 8D are each a diagram explaining the way the three-dimensional orientation of a person is estimated by estimating the two-dimensional orientation based on the plurality of texture images and based on the results thereof. FIG. 8A is a bird's-eye view showing the way a person object 802 is captured by two cameras 801a and 801b. FIG. 8B shows the results of estimating a feature point 803a of the person object 802 from a captured image 804a of the camera 801a and FIG. 8C shows the results of estimating a feature point 803b of the person object 802 from a captured image 804b of the camera 801b, respectively. In FIG. 8B and FIG. 8C, the feature points 803a and 803b indicated by black circles correspond to the head, jaw, neck, chest, abdomen, waist, shoulder, elbow, wrist, crotch, groin, knee, and ankle. It is possible to obtain the positions of these feature points by appending in advance a maker to each region of the human body and capturing it and detecting the position of each region based on the marker from the obtained captured image, and from the obtained results, the two-dimensional orientation of the person captured within the texture image is estimated. FIG. 8D is a diagram explaining the way the three-dimensional position of the chest as the feature point is calculated from the two captured images 804a and 804b. By the geometric triangulation method using the three-dimensional position of each of the cameras 801a and 801b and the two-dimensional position of the chest estimated from each of the captured images 804a and 804b, the three-dimensional position of the chest of the person object 802 is estimated. The three-dimensional position calculation method based on the triangulation method is a publicly known technique, and therefore, explanation is omitted. It may also be possible to identify the two-dimensional position of the feature point of an object from the captured image obtained by, for example, appending a marker to each region taken to be the feature point and capturing it. Further, it may also be possible to identify the three-dimensional position of each region configuring an object from the results of measuring the distance to each region using a laser or the like.

Figure 10:
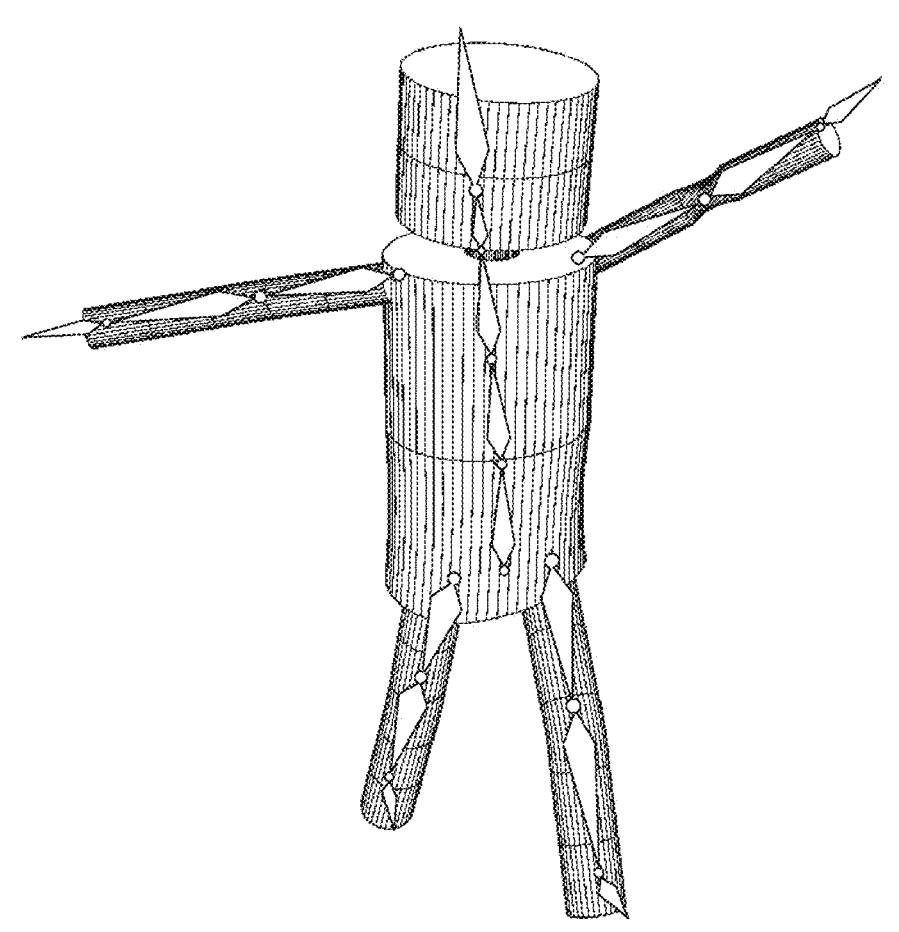
FIG. 10 is a diagram showing a state after a mesh model is deformed in accordance with Bone.

At S605, the deformation processing unit 206 reads and obtains the base model created in advance by CG or the like from the secondary storage device 114 and performs processing to deform the base model based on the orientation information obtained at S604. The base model obtained by this deformation processing is called "deformed base model". FIG. 9A to FIG. 9D are each a diagram explaining deformation of abase model based on orientation information. FIG. 9A is one example of a polygon mesh as an element configuring a base model and shows a triangle and a quadrilateral, which are each a two-dimensional plane. FIG. 9B is one example of a 3D model including a set of polygon meshes (in the following, called "mesh model") and shows a quadrangular pyramid and a circular ring, respectively. Different from the voxel generated at S603, in a case of a mesh model, the shape data is such that only the surface shape of an object is represented. FIG. 9C shows the mesh model of the person object 802 in FIG. 8A to FIG. 8D and FIG. 9D shows the state where the orientation information (Bone) in FIG. 7 is superimposed on the mesh model in FIG. 9C. To each polygon mesh, which is the element configuring the mesh model, a weight (the shorter the distance, the heavier the weight is) in accordance with the distance to Bone is appended. Because of this, in a case where Bone moves, the polygon mesh also moves in accordance with the appended weight and as a result of that, the mesh model deforms. It may also be possible to create the mesh model of a person, which is prepared in advance, for each person taken to be an object, or create only one mesh model representing the shape of an average person. It may also be possible to set a predetermined weight for each region of Bone without depending on the distance from Bone as the weight that is appended to the polygon mesh. FIG. 10 shows the state after deforming the mesh model in FIG. 9C in accordance with Bone. As described above, by each polygon mesh moving in accordance with the position of Bone whose distance is short, the mesh model deforms.

Figure 11A:
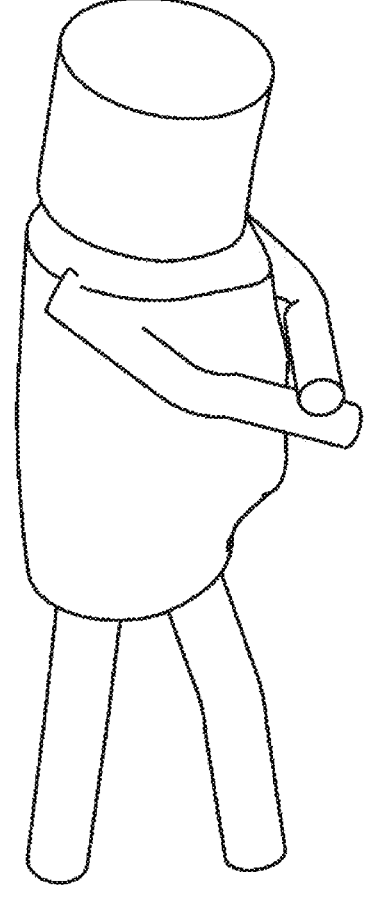
FIG. 11A is a diagram showing one example of a voxel model based on the visual hull method and FIG. 11B is a diagram showing one example of a deformed mesh model.
Figure 11B:
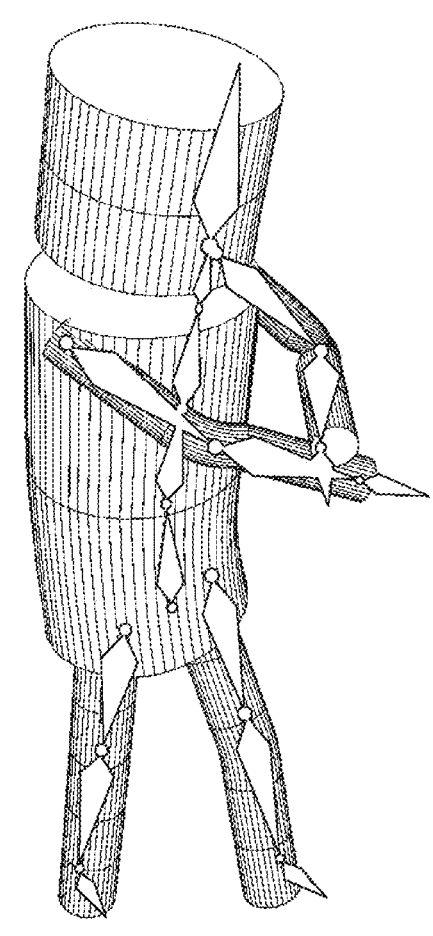
Figure 12:
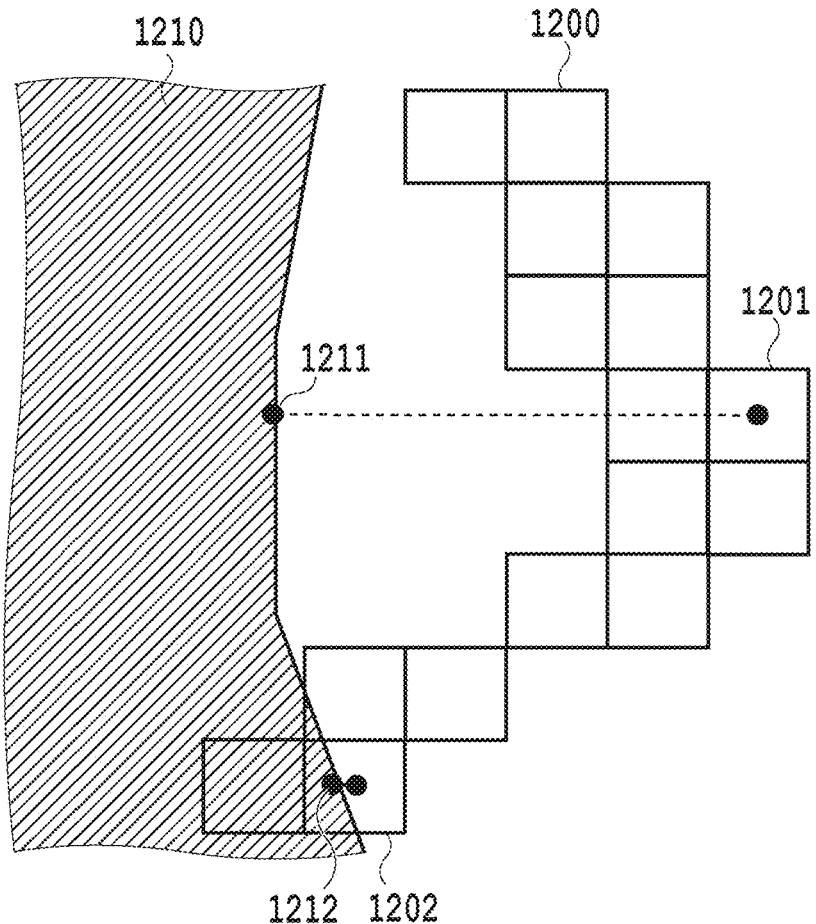
FIG. 12 is a diagram explaining a determination method of model shape accuracy based on the distance between a voxel model and a polygon mesh.

At S606, the model accuracy determination unit 207 determines the shape accuracy of the VH model (voxel model) generated at S603 by using the deformed base model (deformed mesh model) obtained at S605. Specifically, the model accuracy determination unit 207 finds the distance between the position of the voxel configuring the voxel model and the polygon mesh of the closest mesh model and determines that the shape accuracy is low in a case where the found distance is greater than or equal to a threshold value and determines that the shape accuracy is high in a case where the distance is less than the threshold value. FIG. 11A shows one example of a voxel model based on the visual hull method generated at S603. Because the person object 802 takes a posture of folded hands, it is not possible to delete the voxels around the chest by the visual hull method, and therefore, the shape accuracy of the voxel area from under the armpit to the front portion of the chest is low. FIG. 11B shows the deformed mesh model generated at S605, which corresponds to the voxel model in FIG. 11A. The base model (mesh model) is deformed based on the orientation information, and therefore, the mesh model is one whose shape accuracy of the portion around the chest is high. FIG. 12 is a diagram explaining a model shape accuracy determination method based on the distance between the voxel model and the polygon mesh. For a voxel 1201 configuring a voxel model 1200, the distance to a polygon mesh 1211 located at the shortest distance among the polygon meshes configuring a mesh model 1210 is calculated. In this case, the calculated distance is greater than or equal to a threshold value and an accuracy value of "0" indicating that the shape accuracy is low is appended to the voxel 1201. On the other hand, for a voxel 1202, the distance to a polygon mesh 1212 located at the shortest distance among the polygon meshes configuring the mesh model 1210 is calculated. In this case, the calculated distance is less than the threshold value and an accuracy value of "1" indicating that the shape accuracy is high is appended to the voxel 1202. The processing such as this is performed for all the voxels configuring the voxel model 1200 and accuracy information is obtained. As regards the threshold value, it is assumed that a user sets an arbitrary value by taking into consideration the voxel size, the computation cost and the like. Further, in the present embodiment, the accuracy information is binary information obtained by the threshold value processing of each voxel, but the accuracy information is not limited to this and for example, it may also be possible to take the distance between the voxel model and the deformed mesh model as accuracy information as it is.

At S607, the accuracy improvement processing unit 208 performs the accuracy improvement processing by the method disclosed in Document 1 described previously for the VH model (voxel model) generated at S603 based on the texture image included in the foreground image set, the camera parameters, and the accuracy information. Specifically, first, each voxel configuring the voxel model is projected onto the captured image of the camera from which the voxel is viewed. Then, the pixel values of a plurality of texture images at the projection destination are obtained and in a case where the variance of the pixel values is large, processing to delete the projected voxel (voxel of interest) is performed by taking each voxel whose shape accuracy is determined to be low as a target. Then, the same processing is repeated until there is no longer a voxel whose shape accuracy is determined to be low (voxel whose accuracy value is "0) by taking the voxel model thus obtained as a target. This means that the accuracy improvement processing is performed repeatedly several times for the voxel area whose shape accuracy is low of the initial voxel model obtained at S603 and the accuracy improvement processing is not performed or performed just a few times for the voxel area whose shape accuracy is high. As a result of the processing such as this, a voxel model of high accuracy is obtained, which includes the voxel that is not deleted but left among the voxels whose shape accuracy has been determined to be low and the voxel (voxel whose accuracy value is "1") whose shape accuracy has originally been determined to be high. It may also be possible to use the distance to the deformed mesh model calculated for each voxel by the model accuracy determination unit 207 as the accuracy information as it is and take the voxel whose calculated distance is greater than or equal to a threshold value as a target of the accuracy improvement processing. By this method also, it is possible to obtain a voxel model of high accuracy.

The above is the flow of the operation of the 3D model generation device 13 according to the present embodiment. In the present embodiment, the explanation is given by taking a person as an example of a target object, but the target object is not limited to this and the target object may be an animal, car or the like.

Modification Example 1

It may also be possible to determine, based on the voxel size and the distance between the voxel and the mesh model, to which area and to what extent the accuracy improvement processing is applied repeatedly to the voxel model obtained at S603. For example, it is assumed that the voxel size is 5 mm and in a certain voxel area, the distance to the closest polygon mesh is 15 mm. In this case, the result of dividing 15 mm by 5 mm is "3", and therefore, it may also be possible to perform the accuracy improvement processing by determining the number of times of repletion for the voxel area to be three. In a case of this method, it is possible to omit the estimation processing of the shape accuracy of the voxel model at S606 described previously.

Modification Example 2

Figure 13:
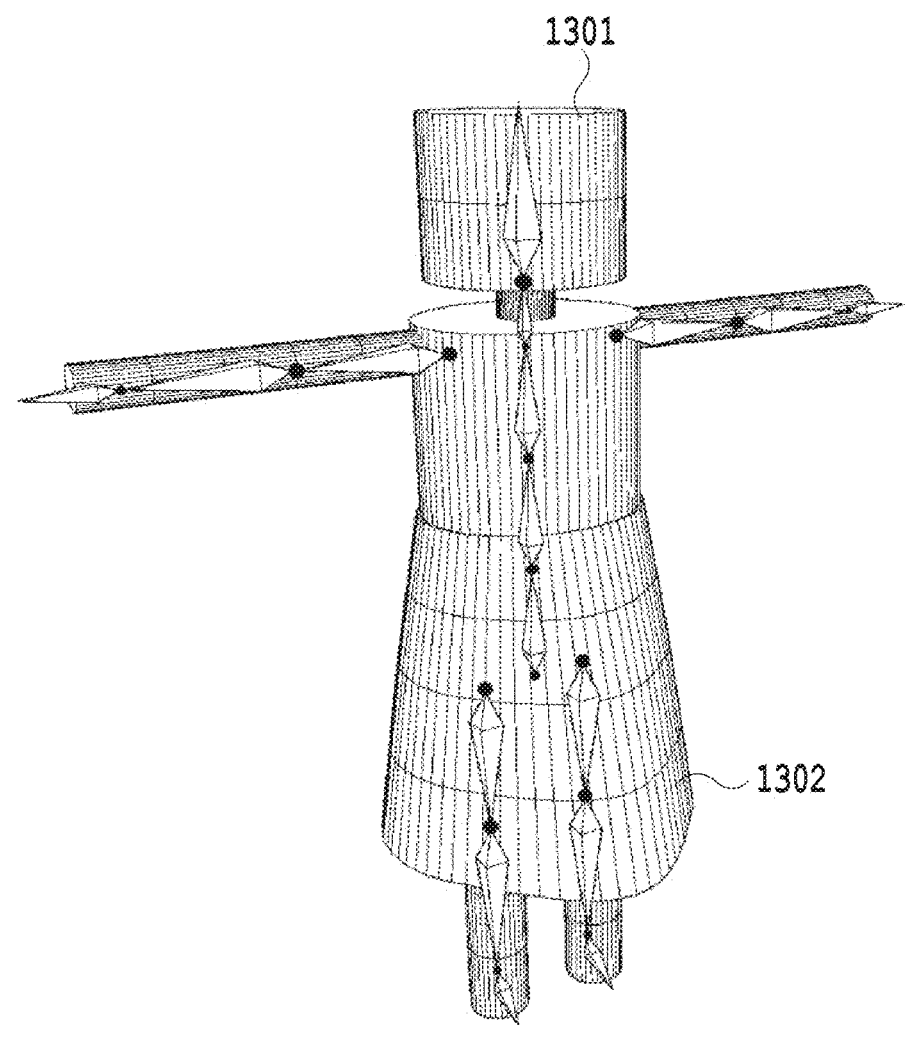
FIG. 13 is a diagram showing one example of a mesh model representing a three-dimensional shape of a person wearing a skirt.

In a case where the target object is a person wearing, for example, a skirt, even by deforming the base model in accordance with the orientation of the person indicated by Bone, the actual shape of the hem portion of the skirt is not reproduced correctly, and therefore, it becomes difficult to correctly determine the shape accuracy of the VH model. Consequently, control is performed so that the VH model is maintained and the accuracy improvement processing is not performed for the portion for which it is difficult to reproduce the actual shape of the target object even by deforming the base model based on the orientation information. Then, in order to implement the above-described control, to the polygon mesh of the specific region corresponding to clothing, accessory and the like among the polygon meshes configuring the base model, information (exclusion information) indicating that the polygon mesh is not the target of the accuracy improvement processing is appended in advance. As the exclusion information, for example, it is sufficient to append a flag value of "1" to the polygon that is excluded from the target of the accuracy improvement processing, a flag value of "0" to the polygon mesh of the portion other than the non-target polygon, and so on. FIG. 13 is one example of a mesh model 1301 representing the three-dimensional shape of a person wearing a skirt. A polygon mesh 1302 corresponding to the hem of the skirt is distant from Bone and the polygon mesh 1302 does not necessarily deform following Bone, and therefore, it is difficult to reproduce the correct shape of the skirt hem portion in a case where the person moves by the deformed mesh model. Consequently, in this case, a base model to which the above-described exclusion information is appended in advance (in the following, called "exclusion information-appended base model") is prepared and the base model storage unit 205 stores this. In the example in FIG. 13 described above, the exclusion information-appended mesh model is created in advance and stored, in which the flag value "1" is appended to the polygon mesh 1302 corresponding to the skirt hem portion and the flag value "0" is appended to the polygon mesh other than the polygon mesh 1302. Then, at S606 shown in the flowchart in FIG. 6 described previously, the model accuracy determination unit 207 determines the shape accuracy of the voxel model by using an exclusion information-appended mesh model. In this determination, first, the minimum distance from each voxel configuring the voxel model to the polygon mesh of the exclusion information-appended mesh model is calculated. Then, in a case where the flag value as the exclusion information appended to the polygon mesh with the minimum distance is "0", the shape accuracy is determined by performing threshold value processing in accordance with the distance as in the embodiment described previously. On the other hand, in a case where the flag value as the exclusion information appended to the polygon mesh with the minimum distance is "1", it is always determined that the shape accuracy is high without performing the threshold value processing in accordance with the distance. In accordance with the accuracy information obtained by the determination such as this, the accuracy improvement processing unit 208 improves the accuracy of the VH model (voxel model) generated at S603.

As above, by excluding the portion, at which the difference from the actual object shape becomes large in a case where the base model is deformed based on orientation information, from the target of the accuracy improvement processing, it is possible to suppress the voxel that should not be deleted from being deleted. As a result of that, it is possible to obtain a 3D model of high accuracy It may also be possible to perform deformation processing to make small the difference from the actual object shape by physical computation taking into consideration the three-dimensional position of each region found from Bone and parameters, such as the wind direction and the airflow volume, in place of excluding the portion corresponding to clothing, accessory and the like from the target of the accuracy improvement processing.

Other Modification Examples

In the above-described accuracy improvement processing, for the specific region whose shape accuracy has been determined to be low by the accuracy information, based on the color information on the texture image, the unnecessary voxel is deleted from the VH model. It may also be possible to delete the unnecessary voxel from the VH model for the specific region whose shape accuracy has been determined to be low by using the information on the distance from the camera, which is obtained by a distance sensor or triangulation method, in place of the color information.

Further, it is only necessary for the base model that is created in advance to be useful for improvement of the shape accuracy for the concave portion and the occlusion area of the target object for which it is difficult to correctly reproduce the shape by the VH model based on the mask image. For example, it may also be possible to take the VH model of high accuracy in the basic orientation as a base model, which is obtained by the accuracy improvement processing of the present disclosure.

As above, according to the present embodiment, it is made possible to generate a 3D model of high accuracy without increasing the processing load by improving the accuracy of the region that is likely to become a 3D model of low quality by the visual hull method with appropriate parameters.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to improve the accuracy of a three-dimensional model.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-100350, filed Jun. 19, 2023 which is hereby incorporated by reference wherein in its entirety.

What is claimed is:

1. An image processing apparatus comprising:
   one or more memories storing instructions; and
   one or more processors executing the instructions to perform:
   obtaining a first model generated by deforming, based on the orientation of an object identified by a plurality of texture images representing a color of the object based on image capturing of a plurality of imaging devices, a base model stored in advance and representing the basic three-dimensional shape of the object;
   obtaining a second model representing the three-dimensional shape of the object, which is generated based on a silhouette image based on image capturing of the plurality of imaging devices;
   deleting one or more unnecessary elements among elements configuring the second model based on a difference between the first model and the second model; and
   determining shape accuracy of the second model based on a difference between the first model and the second model,
   wherein the deleting the one or more unnecessary elements is performed by taking a specific area in the second model as a target based on the determined shape accuracy,
   wherein among elements configuring the base model, to an element corresponding to a specific region of the object, exclusion information indicating whether the element is not the target of the deleting the one or more unnecessary elements is appended in advance,
   wherein the deformation of the base model to which the exclusion information is appended is performed based on the specified orientation of the object,
   wherein in the determination, in a case where the exclusion information appended to the corresponding element in the first model among the elements configuring the second model indicates that the element is not the target of the deleting the one or more unnecessary elements, the element is determined without exception to have a high shape accuracy and in a case where the exclusion information appended to the corresponding element in the deformed base model indicates that the element is the target of the deleting the one or more unnecessary elements, an element whose distance to the element configuring the deformed base model is longer than or equal to a threshold value is determined to be an element whose shape accuracy is low, and
   wherein the deleting the one or more unnecessary elements is performed by taking an area including the element determined to have a low shape accuracy of the second model as the specific area.

2. The image processing apparatus according to claim 1, wherein
the first model is obtained by identifying the orientation of the object and then deforming the base model based on the identified orientation.

3. The image processing apparatus according to claim 1, wherein
the second model is generated by the visual hull method using the silhouette image.

4. The image processing apparatus according to claim 1, wherein
a distance of the element configuring the second model to the element configuring the first model is calculated and
the deleting the one or more unnecessary elements is performed by taking an area including the element whose calculated distance is longer than or equal to a threshold value among the elements configuring the second model as the specific area.

5. The image processing apparatus according to claim 1, wherein
the deleting the one or more unnecessary elements is performed by taking a specific region of the second model as a target based on a size of the element configuring the second model and a distance between the element configuring the second model and the element configuring the first model.

6. The image processing apparatus according to claim 1, wherein
camera parameters of the plurality of imaging devices are obtained and
in processing to delete the one or more unnecessary elements:
an element of interest among the elements configuring the second model is projected onto a texture image of an imaging device from which the element of interest is viewed based on the camera parameters;
the pixel value of the texture image at the projection destination is obtained; and
the deleting the one or more unnecessary elements is performed by determining whether to delete the element of interest based on the variance of the obtained pixel value.

7. The image processing apparatus according to claim 1, wherein
distance information represents from the plurality of imaging devices to the object is obtained and
the deleting the one or more unnecessary elements is performed based on the distance information.

8. The image processing apparatus according to claim 1, wherein
the object is a person and
the orientation of the object is identified by obtaining coordinate data of feature points of the person from each of the plurality of texture images and estimating the three-dimensional orientation of the person by a set of parts simulating a human bone structure based on the obtained coordinate data of the feature points.

9. The image processing apparatus according to claim 1, wherein
the second model represents the three-dimensional shape of the object by a voxel set or the format of point cloud.

10. The image processing apparatus according to claim 1, wherein
the base model represents the basic three-dimensional shape of the object by a set of polygon meshes.

11. An image processing method comprising the steps of:
obtaining a first model generated by deforming, based on the orientation of an object identified by a plurality of texture images representing a color of the object based on image capturing of a plurality of imaging devices, a base model stored in advance and representing the basic three-dimensional shape of the object;
obtaining a second model representing the three-dimensional shape of the object, which is generated based on a silhouette image based on image capturing of the plurality of imaging devices;
deleting one or more unnecessary elements among elements configuring the second model based on a difference between the first model and the second model; and
determining shape accuracy of the second model based on a difference between the first model and the second model,
wherein the deleting the one or more unnecessary elements is performed by taking a specific area in the second model as a target based on the determined shape accuracy,
wherein among elements configuring the base model, to an element corresponding to a specific region of the object, exclusion information indicating whether the element is not the target of the deleting the one or more unnecessary elements is appended in advance,
wherein the deformation of the base model to which the exclusion information is appended is performed based on the specified orientation of the object,
wherein in the determination, in a case where the exclusion information appended to the corresponding element in the first model among the elements configuring the second model indicates that the element is not the target of the deleting the one or more unnecessary elements, the element is determined without exception to have a high shape accuracy and in a case where the exclusion information appended to the corresponding element in the deformed base model indicates that the element is the target of the deleting the one or more unnecessary elements, an element whose distance to the element configuring the deformed base model is longer than or equal to a threshold value is determined to be an element whose shape accuracy is low, and
wherein the deleting the one or more unnecessary elements is performed by taking an area including the element determined to have a low shape accuracy of the second model as the specific area.

12. A non-transitory computer readable storage medium storing a program for causing a computer to perform an image processing method comprising the steps of:
obtaining a first model generated by deforming, based on the orientation of an object identified by a plurality of texture images representing a color of the object based on image capturing of a plurality of imaging devices, a base model stored in advance and representing the basic three-dimensional shape of the object;
obtaining a second model representing the three-dimensional shape of the object, which is generated based on a silhouette image based on image capturing of the plurality of imaging devices;
deleting one or more unnecessary elements among elements configuring the second model based on a difference between the first model and the second model; and
determining shape accuracy of the second model based on a difference between the first model and the second model, wherein the deleting the one or more unnecessary elements is performed by taking a specific area in the second model as a target based on the determined shape accuracy, wherein among elements configuring the base model, to an element corresponding to a specific region of the object, exclusion information indicating whether the element is not the target of the deleting the one or more unnecessary elements is appended in advance, wherein the deformation of the base model to which the exclusion information is appended is performed based on the specified orientation of the object, wherein in the determination, in a case where the exclusion information appended to the corresponding element in the first model among the elements configuring the second model indicates that the element is not the target of the deleting the one or more unnecessary elements, the element is determined without exception to have a high shape accuracy and in a case where the exclusion information appended to the corresponding element in the deformed base model indicates that the element is the target of the deleting the one or more unnecessary elements, an element whose distance to the element configuring the deformed base model is longer than or equal to a threshold value is determined to be an element whose shape accuracy is low, and wherein the deleting the one or more unnecessary elements is performed by taking an area including the element determined to have a low shape accuracy of the second model as the specific area.

\* \* \* \* \*